United States Patent [19]
Saunier et al.

[11] Patent Number: 6,045,836
[45] Date of Patent: Apr. 4, 2000

[54] PACKED IN-PACK FILLED PRODUCT ON STICK

[75] Inventors: Christiane Saunier, Villiers Saint Sepulcre; Bruno Delande, Marseille en Beauvaisis, both of France

[73] Assignee: Nestec S.A., Vevey, Switzerland

[21] Appl. No.: 09/095,921

[22] Filed: Jun. 12, 1998

[30] Foreign Application Priority Data

Jun. 12, 1997 [EP] European Pat. Off. .............. 97201778

[51] Int. Cl.[7] ....................................................... A23G 3/00
[52] U.S. Cl. ........................... 426/91; 426/110; 426/101; 426/134; 426/115; 426/421
[58] Field of Search ..................................... 426/110, 414, 426/421, 91, 101, 115, 413, 393, 125, 134; 425/262; 249/61, 119; 53/432; 222/92

[56] References Cited

U.S. PATENT DOCUMENTS

| D. 210,308 | 2/1968 | Ollier ........................................ D7/672 |
| 1,965,394 | 7/1934 | Schnaier ................................... 426/393 |
| 2,166,568 | 7/1939 | Kuhike ..................................... 426/123 |
| 2,227,236 | 12/1940 | Vogt ........................................ 426/414 |
| 2,877,121 | 3/1959 | Anderson et al. ....................... 426/110 |
| 4,478,386 | 10/1984 | Mikkelsen ................................ 249/83 |

FOREIGN PATENT DOCUMENTS

| 835066 | 5/1960 | United Kingdom . |
| 93/21087 | 10/1993 | WIPO . |
| 95/05749 | 3/1995 | WIPO ................................... 426/104 |

*Primary Examiner*—Nina Bhat
*Assistant Examiner*—Sherry A. Dauerman
*Attorney, Agent, or Firm*—Pennie & Edmonds LLP

[57] ABSTRACT

The invention relates to a packed in-pack filled edible solidified product on a stick and a method for producing the same. A thermoformed plastic package define a 3-dimensional cavity with an inlet channel through which an edible product in liquid or semi-liquid form has been filled. In the inlet channel the stick is arranged, it extends into the edible product in the cavity. A support is provided in the pack for supporting the stick before solidification of the product.

12 Claims, 10 Drawing Sheets

FIG. 9a

PACKED IN-PACK FILLED PRODUCT ON STICK

TECHNICAL FIELD

The present invention relates to a packed in-pack filled solidified edible product on a stick or handle and to a method for providing such a product.

BACKGROUND ART

Examples of this type of product are confections e.g. ice cream or lollies or snacks made from a pourable, liquid or semi-liquid edible product which has been solidified. The product is held on a stick when being consumed.

The conventional way for manufacturing such products is by filling a rigid, cooled metallic mold with the pourable product, solidifying the product sufficiently so that when a stick is inserted, it is hard enough to hold it. The metallic mold is then further cooled to solidify the product further. For releasing the product from the mold, it is then heated for a short period in order to release the solidified product therefrom. The product on the stick is subsequently packed.

An alternative way of providing a wrapped edible product on a stick is disclosed in PCT/EP 94/02493. This patent application describes a packing method wherein a pouch having a tubular portion is formed, a stick is inserted into the tubular form where it extends into the pouch. The pouch is filled with a product while the stick is in the package and subsequently sealed off and finally solidified.

Although this method provides an in-pack filling of the product, it has certain drawbacks such as the necessity of tightly fitting the package around the stick for low viscosity products, to avoid the stick being embedded in the product. This requires an alteration of the stick. It may e.g. be provided with a projection around which the package can be tightly fitted. For high viscosity products the stick may obstruct a regular flow. Furthermore, in prior art in-pack filling, the stick is fully encircled in packing material in the tubular portion.

Another in-pack filled frozen confection package is described in GB 835,066. In this document there is described a package like the one disclosed in PCT/EP 94/02493 however it is only a 2-dimensional pack.

SUMMARY OF THE INVENTION

The present invention may solve the above discussed drawbacks and other problems and provides a simplification of manufacturing by filling the product direct into a 3-dimensional package. The invention gives the possibility of using a conventional flat stick of wood or plastic. Furthermore, the invention allows packing material to be saved as the stick in the packed product does not have to be enclosed in the packing material. This is beneficial both from a cost and an environmental point of view.

Accordingly in a first aspect, the present invention provides a packed in-pack filled edible solidified product on a stick, comprising a edible solidified product, a thermo-formed plastic package defining a 3-dimensional cavity with an inlet channel through which the edible solidified product in liquid or semi-liquid form has been filled, a stick in the inlet channel which extends into the edible solidified product in the cavity, and a support in the pack for supporting the stick before solidification of the edible solidified product.

The support allows the stick to be inserted after the product in liquid or semi-liquid form has been filled into the cavity. The support supports the stick at least until the product is solidified and the stick is fixed within the product. Merely providing a tubular inlet channel will only provide sufficient support for the stick if the stick can be tightly squeezed into the inlet channel. In an automatic manufacturing of in-pack filled products this is not possible as this will require very fine dimensions on the inlet channel and the corresponding sticks. The support will be discussed in further detail below with reference to preferred embodiments of the invention.

The package may be formed from a first and second plastic sheet sealed together along a contour sealing, the sealing being peelable. The first and second sheets are either two separate sheets or a single sheet folded to provide a first and second sheet. The contour is the seam that defines the outer boundary of the cavity and the inlet channel.

The plastic package may be thermo-formed in a nongeometrical 3-dimensional shape. The thermo-forming is advantageously done by blow molding. Alternatively, the cavity and the inlet are obtained by thermo-forming in the packing material two opposing shells which are sealed together afterwards.

In a preferred embodiment of the invention the support of the inlet channel is made by allowing only a portion of sheets between the contour seal of the inlet channel to be thermo-formed. The stick can then be supported between the non-thermo-formed parts of the sheets. Conveniently, this may be done by first providing the contour seal by heating the two sheets in a first tool, then passing the joined sheets to a second blow-molding tool having a mold cavity cross-section at the inlet which is narrower than the cross-section of the contour seal at the inlet channel. Blow-molding the sheets by injecting air between the sheets and thus expanding the sheets towards the mold leaving a zone along the inlet channel un-blown, as shown in the drawings. The un-blown zone of the sheet portions within the contour sealing will not be attached but provides a support and guide for the stick.

Advantageously, the inlet channel adjacent to the contour seal of the cavity has a 1 to 2 mm zone extending from the contour seal which is not thermo-formed. This gives sufficient support for the stick while allowing a certain variation in the dimensions of the inlet channel and the stick.

It is beneficial that the stick extends from the surroundings into the solidified edible product. No full wrapping of the stick is necessary. Therefore, packing material may be saved when compared with former packed and in-pack filled products.

In another advantageous embodiment of the invention the packed in-pack filled edible solidified product has a cavity in which a depression is formed opposite to the inlet channel into which the end of the stick is received. Inserting the stick through the filled cavity and anchoring of the stick is possible by inserting the end of the stick in the depression. In this embodiment the stick also extends out of the package and thus a longer stick is required compared with the embodiment discussed above.

In another aspect, the invention relates to a method for providing a packed in-pack filled edible solidified product on a stick, comprising providing a thermoformed plastic package defining a 3-dimensional cavity with an inlet channel, providing a liquid or semi-liquid edible product, filling the cavity with the liquid or semi-liquid edible product through the filling channel, providing a stick in the inlet channel so that the stick extends into the product in the cavity, supporting the stick by means of a support defined in said package, and solidifying the liquid or semi-liquid edible product on the stick.

In a preferred method the package has an inlet channel which defines the support for the stick. The support is of the above-discussed type.

Alternatively, the support is in the form of a depression for receiving the end of the stick in the cavity. The depression being defined in the cavity opposite the inlet of the filling channel. It follows that in this embodiment of the invention the stick in the inlet extends across the cavity.

In addition, the filled cavity is cooled at its inlet to partly solidify the edible product at the inlet before the stick is inserted. This may provide further support of the stick but is not necessary for the embodiments of the invention discussed above.

In the method according to the invention the package may be made as discussed above. Thus preferably, first and second sheets are peelably sealed along a contour sealing and the cavity and inlet channel are shaped by blow-molding. Alternatively, the inlet channel and the cavity are formed by two shells of thermoformed packing material, with the shells being sealed together afterwards.

Plastic materials suitable for the package may conveniently be selected from the group consisting of: polyolefines e.g. Polyethylene Polypropylene or co-polymers or laminates thereof, polyester, polystyrene, paper or combinations thereof. It is preferred that the packing material once thermo-formed is self supportive in order to obtain well defined shapes of the edible food product filled therein.

The filled packages according to the invention may be provided separately or joined together in a band of packages.

It will be apparent to a skilled person that the present invention may be suitable for many types of products made on the basis of a pourable, liquid or semi-liquid edible product which has been solidified. The invention is especially suitable for products of this type being confections e.g. ice cream or lollies. The invention may also be useful for providing packed in-pack filled savoury or sweet snacks, e.g. cheese or milk based products. The product of this type may conveniently be held on a stick when being consumed.

BRIEF DESCRIPTION OF THE DRAWINGS

The invention will now be explained in further detail with reference to the accompanying drawings, by way of example only, in which the method for providing a packed in-pack filled edible solidified product on a stick is compared with a method of the prior art. In the drawings FIG. 1a to FIG. 9a illustrate the filling, molding, and packaging steps according to the invention in order to provide a packed in-pack solidified product on a stick.

FIG. 1b to FIG. 9b illustrate the steps for filling, molding and packaging in order to provided a packed in-pack prior art and edible solidified product on a stick, FIGS. 10a, b and c illustrate in more detail a preferred embodiment of the stick support according to the invention.

DETAILED DESCRIPTION OF THE PREFERRED EMBODIMENTS

Figure 1A:
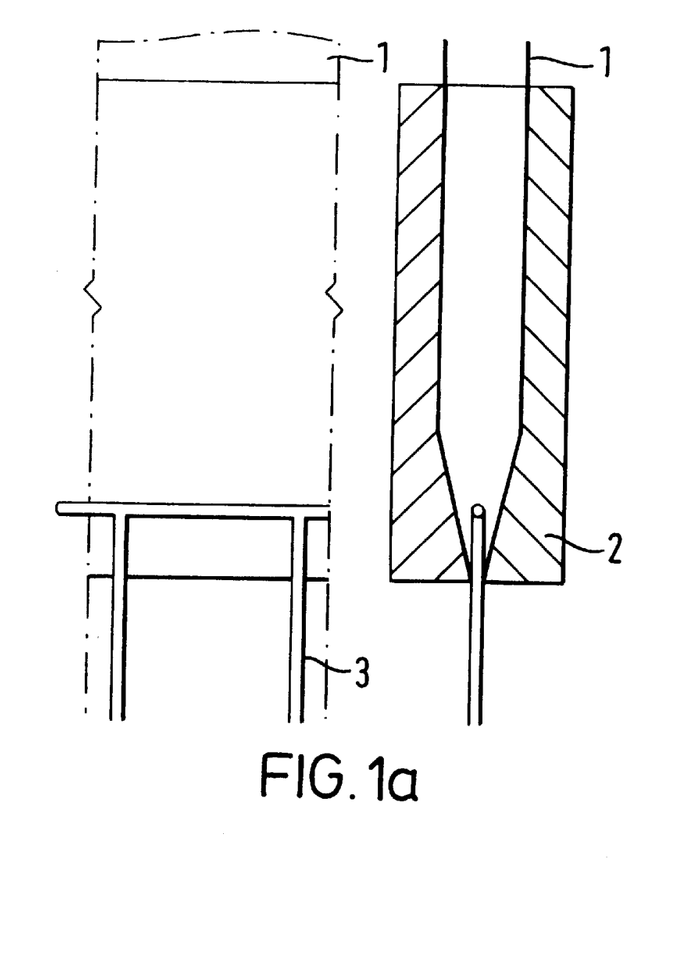
Figure 1B:
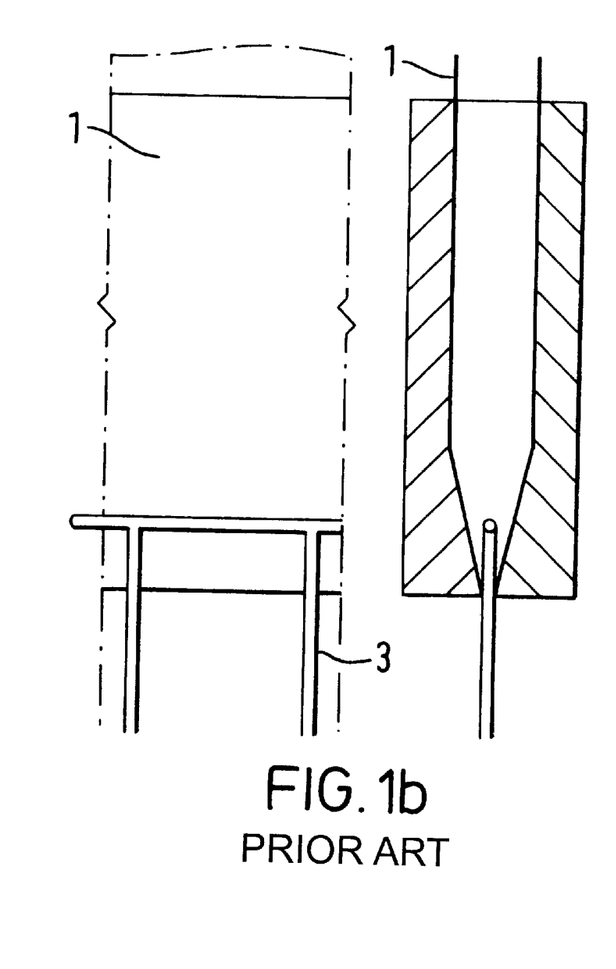
Figure 2A:
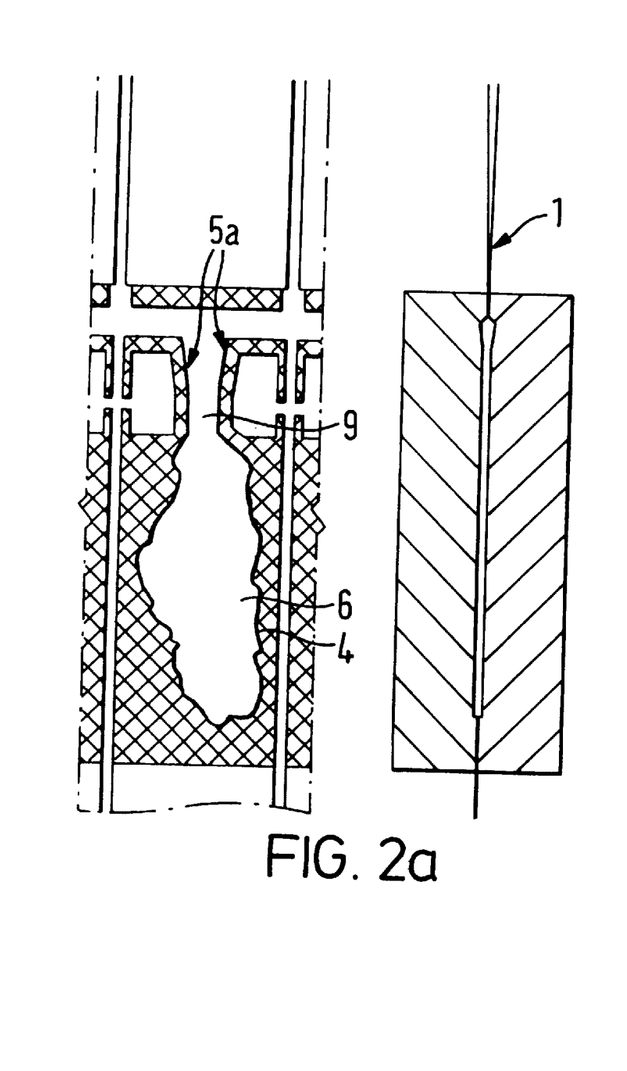
Figure 2B:
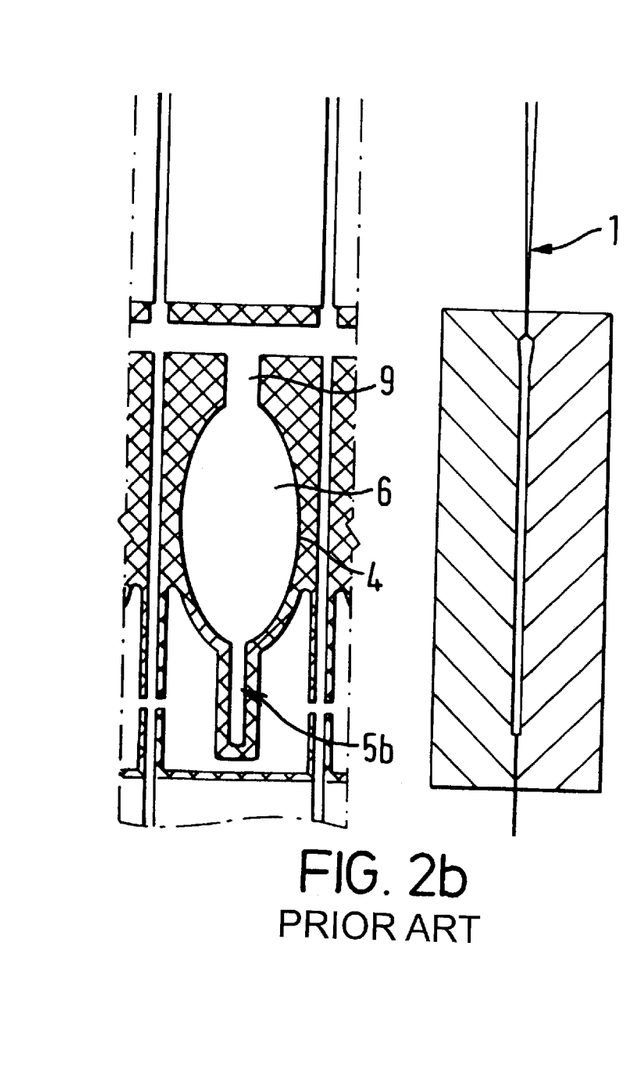

FIG. 1a and FIG. 1b show respectively a front and side view of the plastic sheet material 1 pre-heating introduced into a mold 2 having air supply channels 3. In FIG. 2a and 2b a package cavity 6 and an inlet channel 9 are defined by a contour sealing 4. The sealing, in FIG. 2a, forms part of a stick support 5a and the sealing is a peelable seal. A stick holding cavity 5b is generated in FIG. 2b on the opposite side of the cavity 6.

Figure 3A:
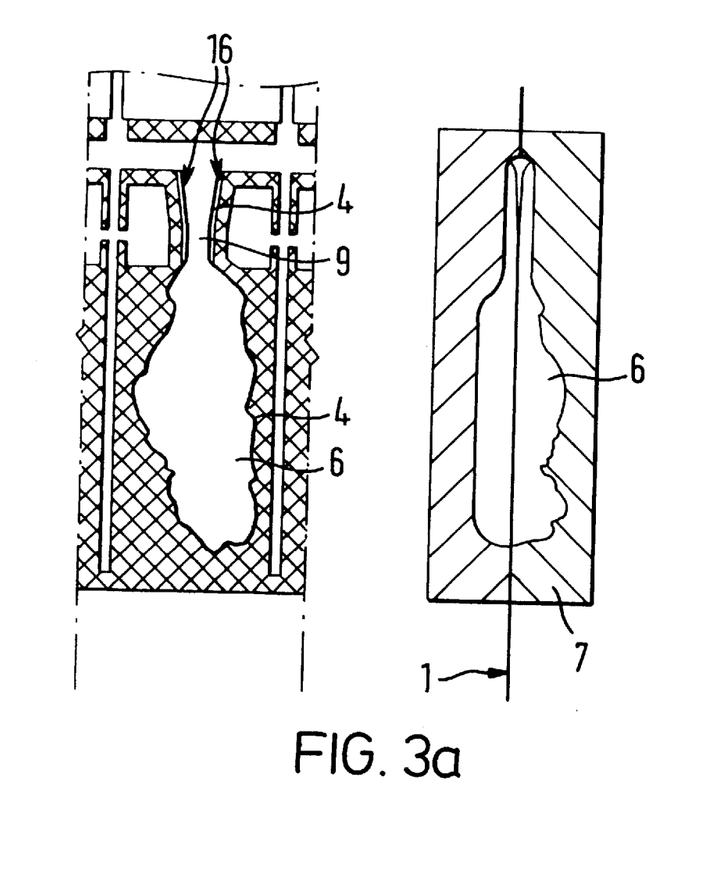
Figure 3B:
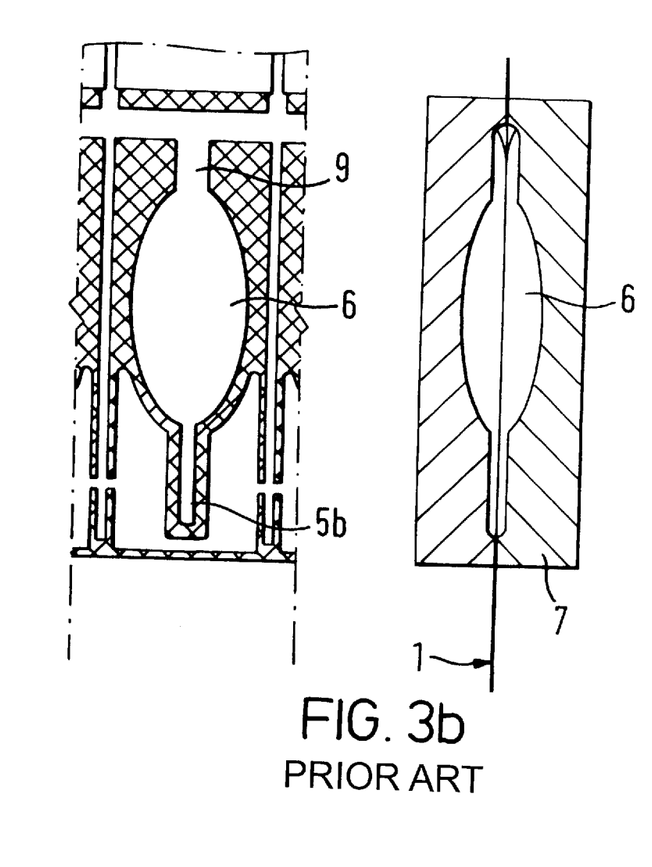

The plastic material 1 with the contour seal 4 is moved to a second mold 7. Air is injected into the air supply channels 3 and the plastic material is blow moulded. Whereas the entire plastic material between the contour sealing, i.e. the cavity 6, the stick holding cavity 5b and the inlet channel 9, in FIG. 3b is blow molded. In FIG. 3a, illustrating an embodiment of the present invention, only a portion of the plastic material 1 between the contour seal 4 of the inlet channel 9 is blow-molded. This will allow for a support 16 of a stick 10 between the non-blow molded parts of the sheets, see FIG. 7a.

Figure 4A:
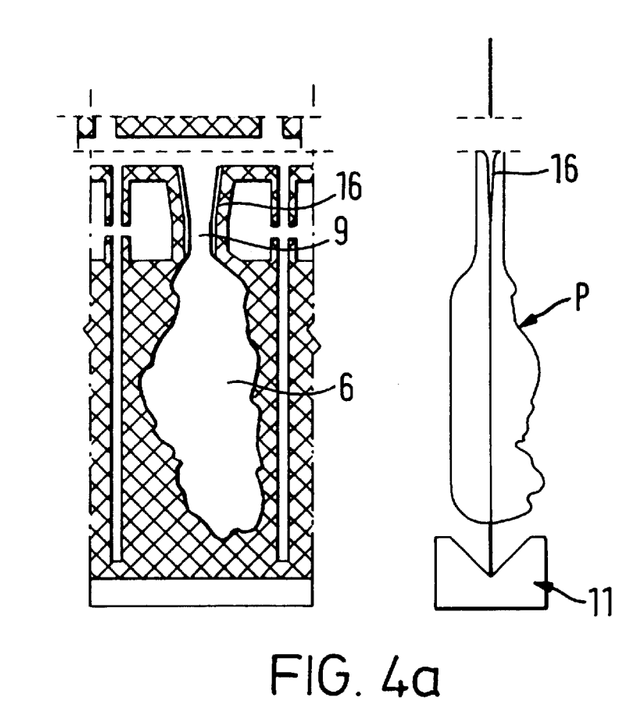
Figure 4B:
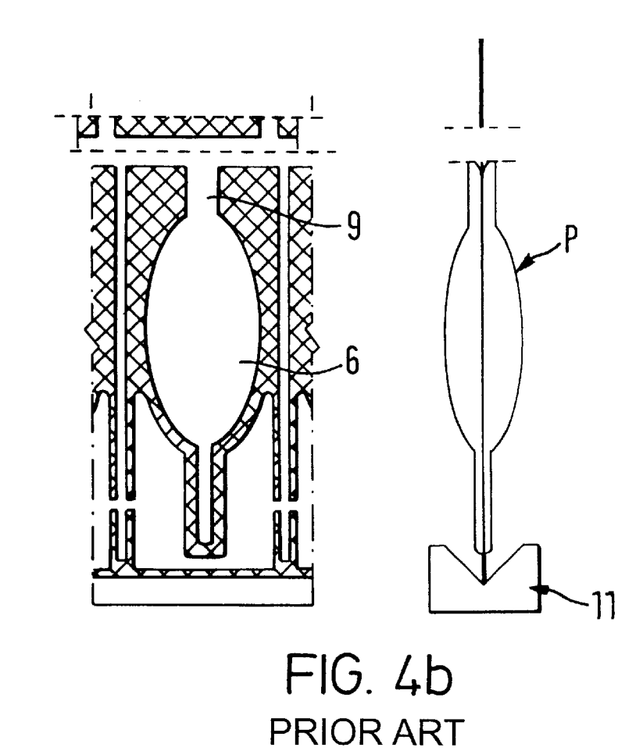

In FIG. 4a and FIG. 4b the molded package p has been removed from the mould 2. Surplus packing material has been cut away from the opening in the inlet channel 9. While packing material 11 opposite the inlet channel 9 has been left to provide support for conveying of the package p. This may for example be necessary when bands of material are used for the forming method and packages are formed successively in the mold as the material 1 is advanced.

Figure 5A:
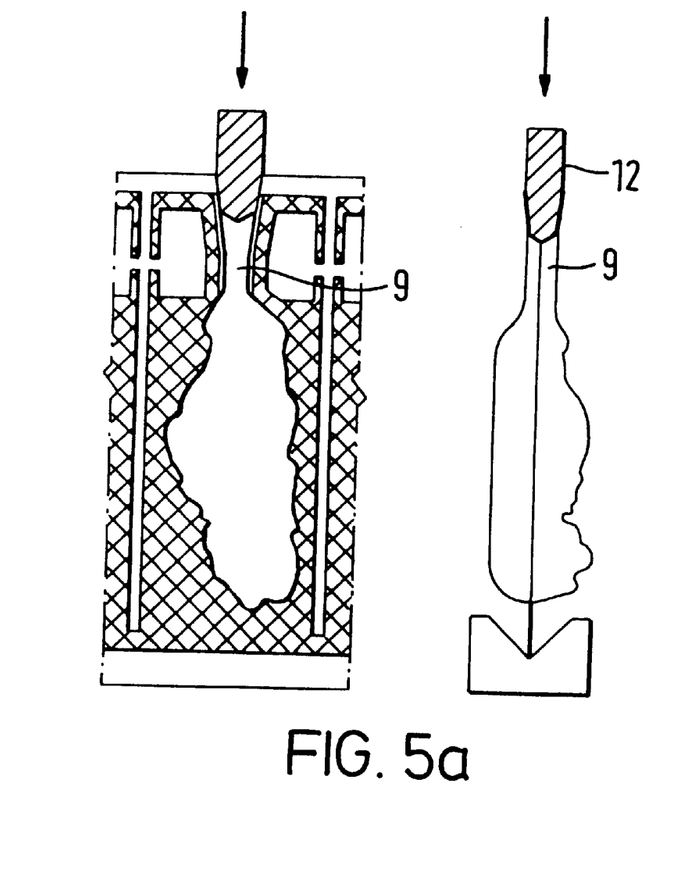
Figure 5B:
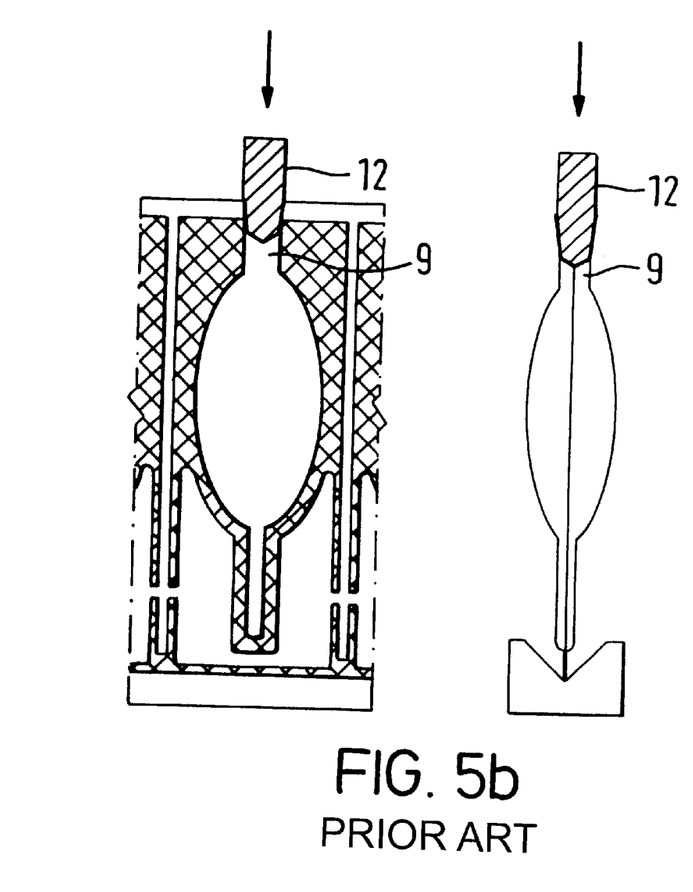

In FIG. 5a and FIG. 5b a pusher 12 is introduced in to the inlet channel 9 in order to ensure opening of the aperture.

Figure 6A:
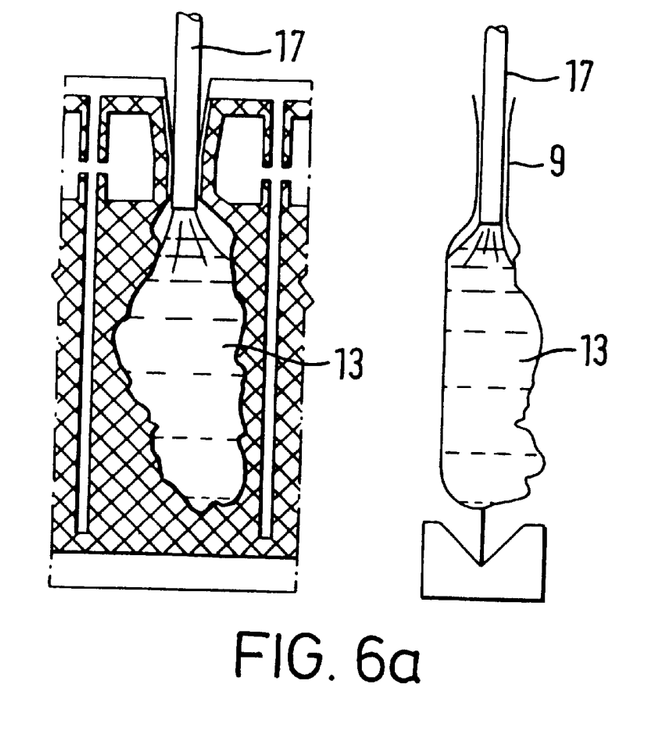
Figure 6B:
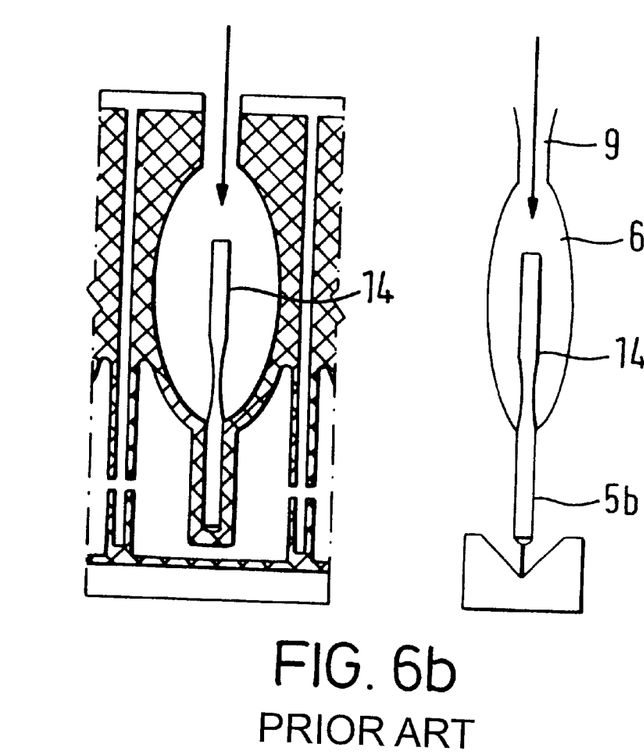

In FIG. 6a, the cavity 6 of the package in accordance with the invention is filled, by a filling nozzle 17, with an edible product 13 in a liquid or semi-liquid form. In the package of the prior art, in FIG. 6b, the stick 14 is inserted through the inlet channel 9, through the cavity 6, and into the stick-holding cavity 5b. In order to provide a sufficiently tight fitting around the stick 14, it is necessary to use a specially designed stick. In the present example the stick is tubular with a varying diameter. In its end position, the stick 14 does not extend through the inlet channel 9 but the end of the stick is in the interior of the cavity 6.

Figure 7A:
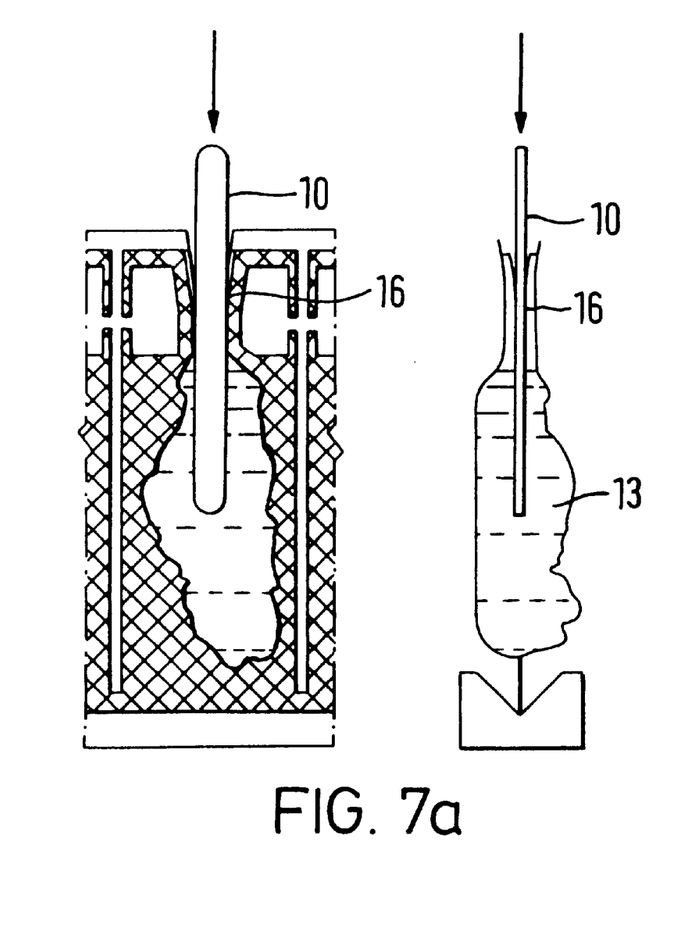

Subsequently, in FIG. 7a a stick 10 is inserted through the same inlet channel 9 through which the filling of the product was done. The stick 10 extends partly into the product in the cavity 6, wherein the support 16 is provided in the pack for supporting the stick 10 before solidification of the product. In this embodiment of the invention a flat conventional stick is used.

Figure 7B:
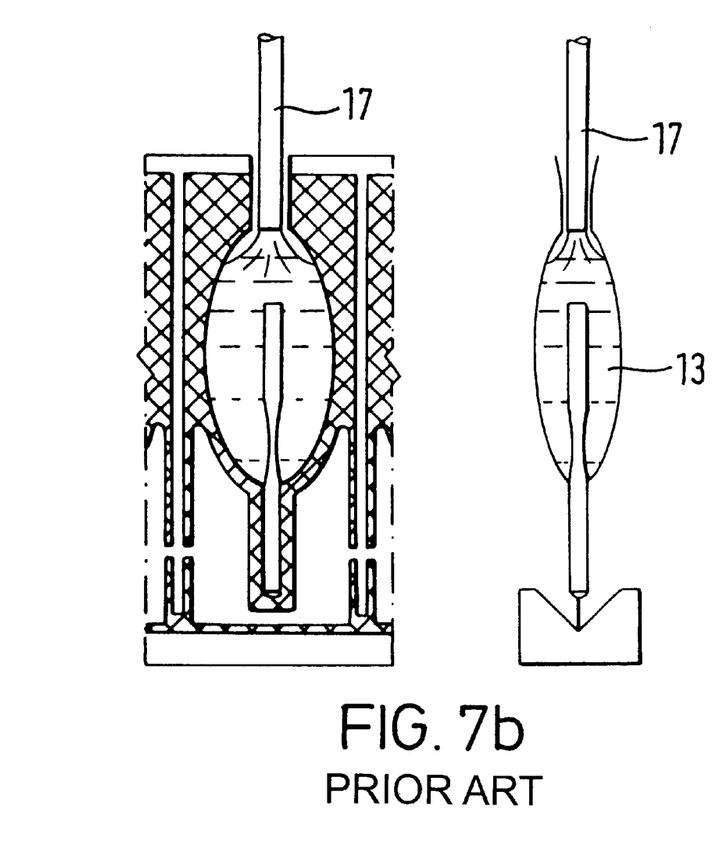

In FIG. 7b a liquid product 13 is filled, through a filling nozzle 17, into the cavity 6 through the inlet channel 9, the stick 14 extends into the cavity from opposite the inlet channel 9 as described above.

Figure 8A:
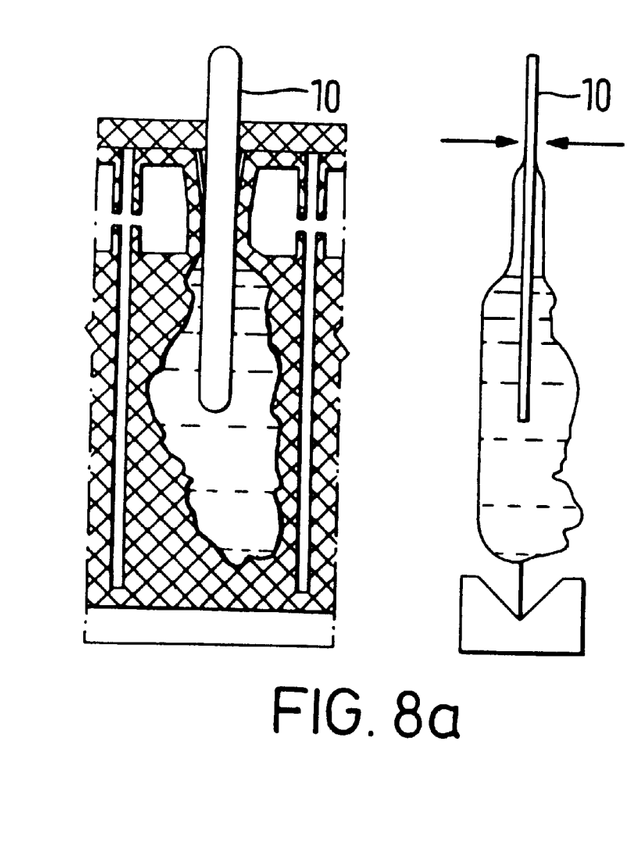
Figure 8B:
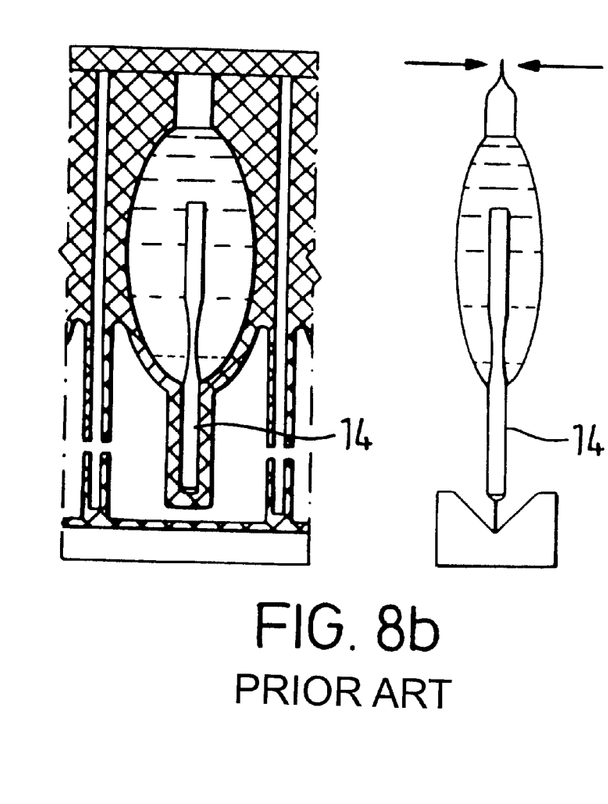
Figure 9A:
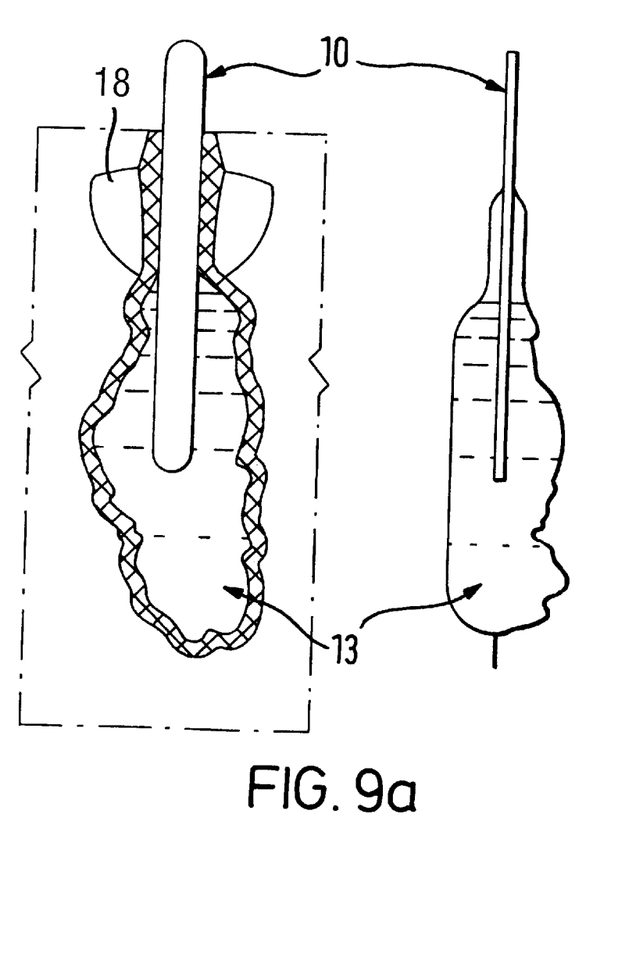
Figure 9B:
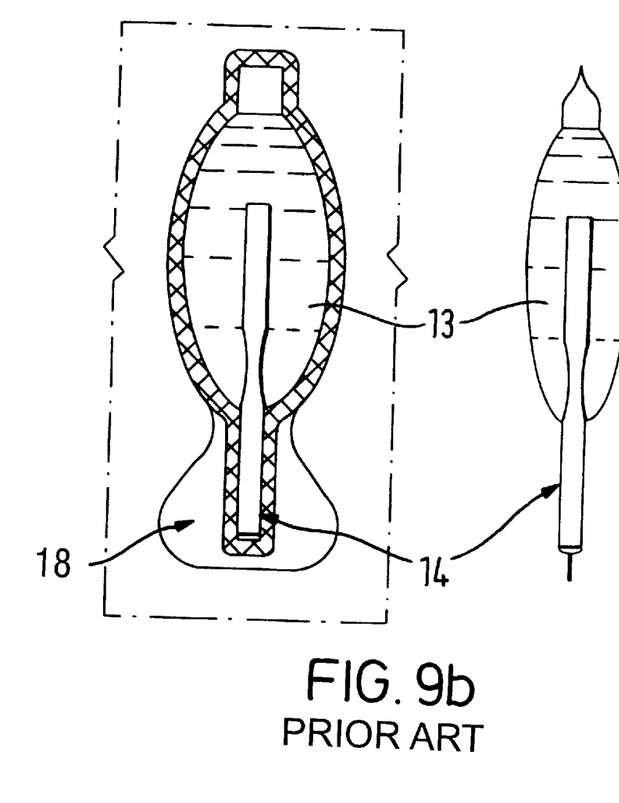

In FIG. 8a and 8b the packages are sealed off by heating the material and thus allowing it to shrink. In FIG. 8a the sealing is made around the stick while the closure of the package in FIG. 8b is done at the top of the package. Both packages are now cut on the outside of the contour sealing, leaving part of the plastic sheet material 1 as pulling or opening tab 18, see FIG. 9.

The product is then left to solidify and a packed in-pack filled product is provided.

The above examples illustrate some of the differences of the invention over prior packed in-pack filled edible products on a stick. The present invention may thus provide a packed in-pack filled edible product avoiding soiling of the stick and the necessity of a specially designed stick.

Figure 10A:
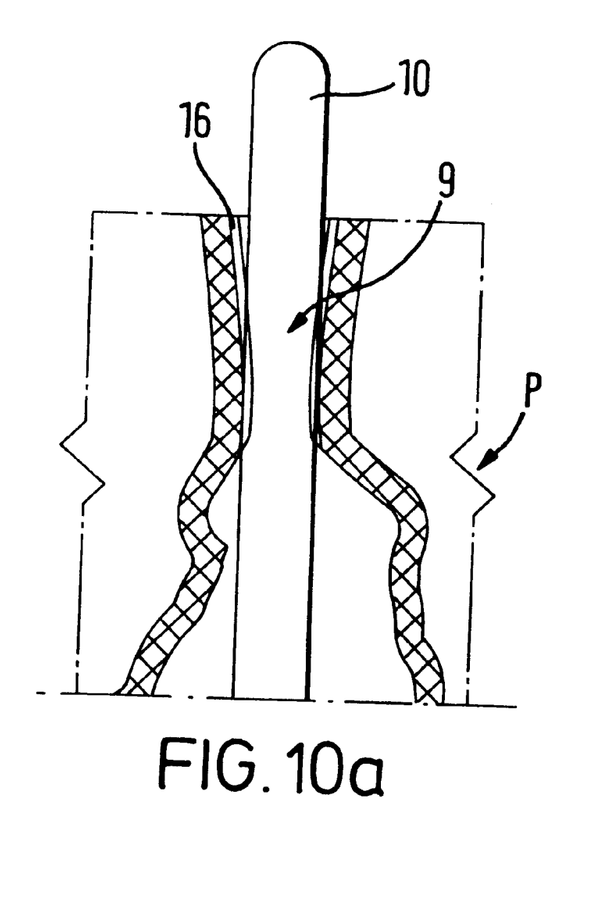
Figure 10B:
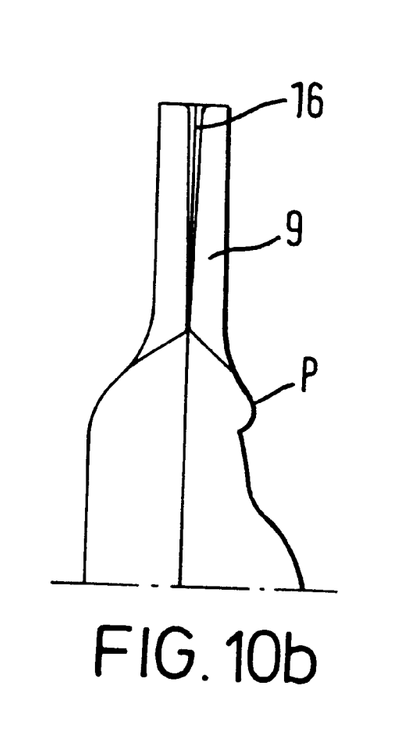
Figure 10C:
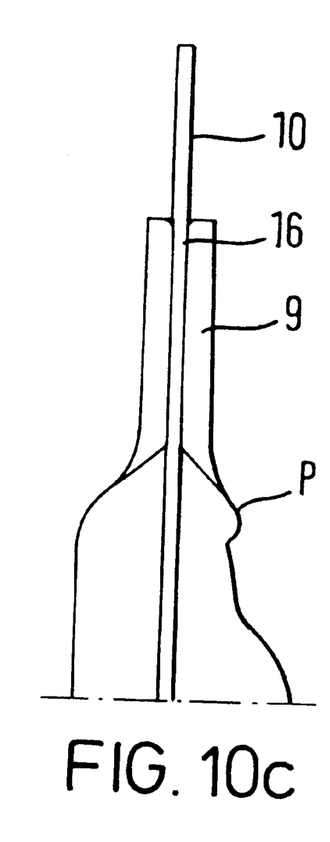

FIGS. 10a, b and c illustrate in more detail a preferred embodiment of the stick support according to the invention. FIG. 10b shows a side view of a package inlet channel 9 before a stick is inserted into the package. The inlet channel having a slightly conical split 16 before the stick is inserted. FIG. 10a and c show front and side views of the inlet channel 9 with a stick 10 inserted and supported therein. The front view shows the conical split of the stick support 16 into which the stick 10 is wedged.

What is claimed is:

1. A packed in-pack filled edible solidified product on a stick, comprising:

a plastic package comprising a thermoformed cavity made in a self-supportive material, the cavity defining a 3-dimensional form adapted to mold an edible pourable product to a solidified one, and an edible solidified product in said thermoformed cavity, the plastic package further comprising an inlet channel adapted for introducing the edible solidifiable product into the package, a stick member comprising a first portion which extends into the solidified product in the cavity and a second portion which extends outside of the cavity, a wedge-shaped support portion which provides support to the second portion of the stick member and which retains the stick member in position during solidification of the solidifiable product in the cavity.

2. Packed in-pack filled edible solidified product according to claim 1, wherein the package is formed from first and second plastic sheets peelably sealed together along a contour sealing.

3. Packed in-pack filled edible solidified product according to claim 2, wherein only a portion of sheet between the contour seal of the inlet channel is thermoformed and the stick member is supported between the non-thermoformed parts of the sheets.

4. Packed in-pack filled edible solidified product according to claim 3, wherein the inlet channel adjacent to the contour seal of the cavity has a 1 to 2 mm zone extending from the contour seal which is not thermoformed.

5. Packed in-pack filled edible solidified product according to claim 1 wherein the package is blow-molded.

6. Packed in-pack filled edible solidified product according to claim 1, wherein the stick member is received in a cavity having a depression opposite the inlet channel into which the first portion of the stick member is received.

7. A packed in-pack filled edible solidified ice cream product on a stick, comprising:

a plastic package comprising a thermoformed cavity made in a self-supportive material, the cavity defining a 3-dimensional form adapted to mold an edible pourable ice cream product to a solidified one, and an edible solidified ice cream product in said thermoformed cavity, the plastic package further comprising an inlet channel adapted for introducing the edible solidifiable ice cream product into the package, a stick member comprising a first portion which extends into the solidified ice cream product in the cavity and a second portion which extends through and outside of the cavity, a wedge-shaped support portion which provides support to the second portion of the stick member and which retains the stick member in position during solidification of the solidifiable ice cream product in the cavity.

8. Packed in-pack filled edible solidified ice cream product according to claim 7, wherein the package is formed from first and second plastic sheets peelably sealed together along a contour sealing.

9. Packed in-pack filled edible solidified ice cream product according to claim 8, wherein only a portion of sheet between the contour seal of the inlet channel is thermoformed and the stick member is supported between the non-thermoformed parts of the sheets.

10. Packed in-pack filled edible solidified ice cream product according to claim 9, wherein the inlet channel adjacent to the contour seal of the cavity has a 1 to 2 mm zone extending from the contour seal which is not thermoformed.

11. Packed in-pack filled edible solidified ice cream product according to claim 7 wherein the package is blow-molded.

12. Packed in-pack filled edible solidified ice cream product according to claim 7, wherein the stick member is received in a cavity having a depression opposite the inlet channel into which the first portion of the stick member is received.

* * * * *